Feb. 8, 1927.

J. DAHL 1,616,952

ROLLER SKATE

Filed Feb. 25, 1926

INVENTOR
John Dahl
By Jack Snyder
Attorney

Patented Feb. 8, 1927.

1,616,952

UNITED STATES PATENT OFFICE.

JOHN DAHL, OF PITTSBURGH, PENNSYLVANIA.

ROLLER SKATE.

Application filed February 25, 1926. Serial No. 90,528.

My invention relates to certain new and useful improvements in roller skates, and the primary object thereof is to provide a roller skate of the type described, which embodies three aligned rollers, one of which is resiliently mounted to facilitate skating, particularly the turning operation.

Further objects of the invention are to provide a device of the character stated, in a manner hereinafter referred to, which is simple in its construction and arrangement, strong, durable and efficient in its use, adjustable and comparatively inexpensive to manufacture.

With the foregoing and other objects in view, which will appear as the description proceeds, the invention resides in the combination and arrangement of parts and in the details of construction hereinafter described and claimed, it being understood that changes in the precise embodiment of the invention hereinafter disclosed can be made within the scope of what is claimed without departing from the spirit of the invention.

In the drawing wherein like numerals of reference designate corresponding parts throughout the several views: Figure 1 is a side elevational view of a roller skate, partly in section, constructed in accordance with my invention.

Figure 2 is an enlarged sectional view on line II—II, Figure 1.

Referring in detail to the drawing 1 denotes a flat metallic body portion consisting of a foot plate provided with the usual securing clamps 2 and heel counter 3. A channel-shaped support 4 is fixed to the under side of the foot plate 1 and extends longitudinally and centrally of the latter.

The support 4 is integrally formed with three pairs of depending bearing brackets, respectively, indicated at 5, 6 and 7. The front roller 8 is rotatably mounted on the axle bolt 9 which is connected in the pair of bearing brackets 5. The rear roller 10 is rotatably mounted on the axle bolt 11 which is connected in the pair of bearing brackets 7, and the center roller 12 is rotatably mounted on the axle bolt 13 which is connected in the pair of bearing brackets 6. Each of the rollers 8, 10 and 12 is preferably provided with a rubber tire 14.

The rollers 8, 10 and 12, are longitudinally aligned, relatively to each other and the lower peripheral edge of the center roller 12 is normally disposed to extend below the plane of the lower peripheral edge of the other of said rollers 8 and 10.

The axle bolt 13 and the center roller 12, carried thereby, are vertically shiftable in the associated pair of bearing brackets 6, as the latter are formed with elongated bearing slots 15, for the reception of the axle bolt 13.

A tension yoke 16 is mounted between the pair of bearing brackets 6 and straddles the upper portion of the center roller 12. The lower ends of the tension yoke 16 are provided with open slots 17 and engage the axle bolt 13 on the respective sides of the center roller 12.

The foot plate 1 and the underlying portion of the support 4 are formed with an aperture 18 which is disposed centrally over the center wheel 12. An internally threaded sleeve 19 is mounted in the aperture 18 and is fixed in position by a pair of diametrically disposed, integrally formed ears 20, which are secured to the foot plate 1 by means of rivets 21.

A comparatively heavy spiral spring 22 is mounted on top of the tension yoke 16 and extends into the sleeve 19. The spring 22 is maintained in position on the yoke 16 by its engagement with the stem 23, which is formed integrally with the yoke 16 and extends into the spiral spring 22. The spring 22 is properly tensioned by the adjustment of the flat plug screw 24 which engages the upper end thereof and is threadably engaged in the sleeve 19. The plug screw 24 is formed with a groove 25 on its outer face to permit of its engagement with a suitable implement to facilitate the adjustment of the plug screw 24 when tensioning the spring 22.

The tension yoke 16 is maintained in proper alignment in the pair of bearing brackets 6 by a pair of guide screws 26. The latter are detachably mounted in respective sides of the yoke 16 adjacent to the upper end thereof, and extend laterally through and shift in respective guide slots 27 formed in the pair of bearing brackets 6.

It will be noted that the removal of the plug screw 24 will permit of the convenient removal of the spring 22 and tension yoke 16 for the purpose of replacement of these parts, or for any other reason required.

As the center roller 12 is normally disposed below the plane of the other rollers 8 and 10, the weight of the skater will cause the center roller 12 to shift vertically in its bearing brackets slots 15 by the contraction of the spring 22, whereby the skate will normally travel on all three of the aligned rollers 8, 10 and 12. In making a turn, however, the skater places his weight on his heel whereby the action of the spring 22 will force the center roller 12 downwardly and elevates the front roller 8 from its engagement with the path of travel. By thus decreasing the length of the contacting points of the skate with the floor, the turning operation is greatly facilitated.

What I claim is:

1. A roller skate comprising a body portion, a plurality of rollers rotatably connected with said body portion, certain of said rollers having the lower peripheral edge thereof normally disposed below the lower peripheral edge of the other of said rollers and having a resiliently shiftable connection with said body portion, and means for adjusting the tension of said resiliently shiftable connection.

2. A roller skate comprising a body portion, three longitudinally aligned rollers rotatably connected with said body portion, the lower peripheral edge of the centrally positioned roller being normally disposed below the lower peripheral edge of the other of said rollers, said centrally positioned roller having a resiliently shiftable connection with said body portion, and means for adjusting the tension of said resiliently shiftable connection.

3. A roller skate comprising a body portion provided with three pairs of bearing brackets longitudinally aligned relatively to each other, an axle bolt connected in each pair of bearing brackets, a roller rotatably mounted on each of said axle bolts, the lower periphery of the centrally disposed roller being disposed below the plane of the lower periphery of the other of said rollers, the centrally disposed bearing brackets formed with elongated slots for the reception of the associated axle bolt, a tension yoke engaging the axle bolt of said centrally disposed roller, a spring mounted on said yoke, and means mounted in said body portion and engaging said spring for adjusting the tension of the latter, substantially as described and for the purpose set forth.

4. A roller skate comprising a body portion provided with three pairs of bearing brackets longitudinally aligned relatively to each other, an axle bolt connected in each pair of bearing brackets, a roller rotatably mounted on each of said axle bolts, the lower periphery of the centrally disposed roller being disposed below the plane of the lower periphery of the other of said rollers, the centrally disposed bearing brackets formed with elongated slots for the reception of the associated axle bolt, a tension yoke engaging the axle bolt of said centrally disposed roller, a spring mounted on said yoke, means mounted in said body portion and engaging said spring for adjusting the tension of the latter, and means carried by said yoke and engaging said centrally disposed pair of bearings for maintaining said yoke in the aligned position, substantially as described and for the purpose set forth.

In testimony whereof I affix my signature.

JOHN DAHL.